(12) United States Patent
Yang

(10) Patent No.: US 12,042,347 B1
(45) Date of Patent: Jul. 23, 2024

(54) DIFFERENT-AXIS BIDIRECTIONAL BRUSH HEAD STRUCTURE AND ELECTRIC TOOTHBRUSH

(71) Applicant: Qixiang Yang, Mianyang (CN)

(72) Inventor: Qixiang Yang, Mianyang (CN)

(*) Notice: Subject to any disclaimer, the term of this patent is extended or adjusted under 35 U.S.C. 154(b) by 0 days.

(21) Appl. No.: 18/235,090

(22) Filed: Aug. 17, 2023

(51) Int. Cl.
*A61C 17/34* (2006.01)
*A61C 17/22* (2006.01)

(52) U.S. Cl.
CPC ........ *A61C 17/3409* (2013.01); *A61C 17/222* (2013.01)

(58) Field of Classification Search
CPC ......... A46B 13/02; A46B 7/06; A46B 5/0004; A46B 5/0012; A46B 9/045; A61C 17/16; A61C 17/26; A61C 17/08; A61C 17/3409
See application file for complete search history.

(56) References Cited

U.S. PATENT DOCUMENTS

2018/0021118 A1\* 1/2018 Hauser ..................... A46B 9/04 15/22.2

FOREIGN PATENT DOCUMENTS

| CN | 217219260 U | \* | 8/2022 | |
|---|---|---|---|---|
| CN | 115192237 A | \* | 10/2022 | |
| WO | WO-2012086955 A1 | \* | 6/2012 | ........... A46B 5/0012 |

\* cited by examiner

*Primary Examiner* — Shay Karls
(74) *Attorney, Agent, or Firm* — Bay State IP, LLC (57) ABSTRACT

The present disclosure provides a different-axis bidirectional brush head structure and an electric toothbrush, wherein head structure includes a brush head body, a transmission shaft, a first bristle component and a second bristle component, wherein the transmission shaft is located in the brush head body and rotates in the same direction or reciprocates in different directions with its own axis as the axis; the transmission shaft is in transmission connection with the first bristle component for driving the first bristle component to rotate clockwise or counterclockwise; the first bristle component is in transmission connection with the second bristle component, rotation directions of the first bristle component and the second bristle component are opposite, a distance between the first bristle component and the second bristle component gradually increases along the direction away from the transmission shaft, and the first bristle component and the second bristle component are in a V-shaped structure.

7 Claims, 7 Drawing Sheets

DIFFERENT-AXIS BIDIRECTIONAL BRUSH HEAD STRUCTURE AND ELECTRIC TOOTHBRUSH

TECHNICAL FIELD

The present disclosure relates to the technical field of electric toothbrushes, and in particular to a different-axis bidirectional toothbrush head structure and an electric toothbrush.

BACKGROUND

Brushing teeth is not only an important self-oral cavity health care method to remove dental plaque, soft dirt and food residue with a toothbrush and keep the oral cavity clean, but also the most important means for people to remove plaque by themselves and prevent the occurrence, development and recurrence of periodontal diseases. At present, most electric toothbrushes are of a vibrating or rolling brush type, which use an acoustic wave motor or an eccentric shaft motor and a rotary motor to drive a brush head to rotate so as to clean the teeth and the oral cavity.

The applicant found that there are at least the following technical problems in the prior art. Most of the electric toothbrushes in the prior art only have a single bristle part, so that when a user brushes his/her teeth, the bristle part can only clean one side or a small part of the teeth, the cleaning efficiency is low, and cleaning dead angles easily occur.

SUMMARY

The purpose of the present disclosure is to provide a different-axis bidirectional brush head structure and an electric toothbrush, so as to solve the technical problems of a low cleaning efficiency and a poor cleaning effect of the brush head structure of the electric toothbrush in the prior art. Many technical effects that can be produced by the preferred technical scheme among the technical schemes provided by the present disclosure are described in detail hereinafter.

To achieve the above purpose, the present disclosure provides the following technical scheme.

The present disclosure provides a different-axis bidirectional brush head structure, comprising a brush head body, a transmission shaft, a first bristle component and a second bristle component, wherein:
   the transmission shaft is located in the brush head body and rotates in the same direction or reciprocates in different directions with its own axis as the axis;
   the transmission shaft is in transmission connection with the first bristle component for driving the first bristle component to rotate clockwise or counterclockwise;
   the first bristle component is in transmission connection with the second bristle component, rotation directions of the first bristle component and the second bristle component are opposite, a distance between the first bristle component and the second bristle component gradually increases along the direction away from the transmission shaft, and the first bristle component and the second bristle component are in a V-shaped structure.

Preferably, the first bristle component comprises a first brush rod, the second bristle component comprises a second brush rod, the transmission shaft is connected with the first brush rod, the first brush rod and the second brush rod are in meshing transmission through a gear component, and the distance between the first brush rod and the second brush rod gradually increases in the direction away from the gear component.

Preferably, the first bristle component further comprises a first bristle part, one end of the first brush rod away from the transmission shaft extends out of the brush head body, and the first bristle part is fixed to the end of the first brush rod;
   the second bristle component further comprises a second bristle part, one end of the second brush rod away from the transmission shaft extends out of the brush head body, and the second bristle part is fixed to the end of the second brush rod.

Preferably, the first bristle part and the second bristle part both comprise a body, a cleaning bristle and a massage brush rod, the cleaning bristle is arranged around a circumference of the body, the massage brush rod is fixed to the body and is arranged at intervals along the length direction of the body, and one end of the massage brush rod away from the body is provided with a massage ball.

Preferably, the brush head structure further comprises a protection plate, and the protection plate is fixedly connected to the end of the brush head body and covers the first bristle part or the second bristle part.

The present disclosure further provides an electric toothbrush, comprising a machine body, a driving mechanism and a different-axis bidirectional brush head structure described above, wherein the machine body is fixedly connected with a brush head body: the driving mechanism is in driving connection with a transmission shaft, and drives the transmission shaft to rotate in the same direction or reciprocate in different directions with its own axis as the axis.

Preferably, the driving mechanism comprises a driving device, a screw, and a first gear component, a second gear component, a third gear component and a connecting shaft which are rotatably connected in the machine body, wherein:
   the driving device is fixed in the machine body and is in driving connection with the screw for driving the screw to rotate, and the screw is always in meshing transmission with the first gear component and the second gear component;
   the first gear component or the second gear component is in meshing transmission with the third gear component, thereby driving the third gear component to rotate clockwise or counterclockwise, the third gear component is in transmission connection with the connecting shaft, and the connecting shaft is fixedly connected with the transmission shaft.

Preferably, the first gear component comprises a first shaft rod rotatably connected in the machine body, first circumferential teeth and first arc-shaped teeth fixed to the first shaft rod, the first circumferential teeth are arranged around a circumference of the first shaft rod and are in meshing transmission with the screw, and a central angle of the first arc-shaped teeth is less than 360 degrees:
   the second gear component comprises a second shaft rod rotatably connected in the machine body, second circumferential teeth and second arc-shaped teeth fixed to the second shaft rod, the second circumferential teeth are arranged around a circumference of the second shaft rod and are in meshing transmission with the screw, and a central angle of the second arc-shaped teeth is less than 360 degrees;
   when the first arc-shaped teeth are in meshing transmission with the third gear component, the second arc-shaped teeth are disengaged from the third gear component, and when the first arc-shaped teeth are disengaged from the third gear component, the second arc-shaped teeth are in meshing transmission with the third gear component.

Preferably, the central angle of the first arc-shaped teeth is smaller than that of the second arc-shaped teeth, so that an angle at which the connecting shaft rotates in a counterclockwise direction is different from an angle at which the connecting shaft rotates in a clockwise direction.

Preferably, a crown gear is fixed at an end of the connecting shaft, and the crown gear is located in the machine body and is in meshing transmission with the third gear component.

Compared with the prior art, the different-axis bidirectional brush head structure and the electric toothbrush according to the present disclosure have the following beneficial effects. According to the brush head structure of the structure, the first bristle component and the second bristle component are in a V-shaped structure, so that an inner side surface, an occlusal surface, or an outer side surface and an occlusal surface of the same tooth can be cleaned at the same time, and the cleaning efficiency and the cleaning effect are improved. Because the transmission shaft rotates in the same direction or reciprocates in different directions with its own axis as the axis, the transmission shaft drives the first bristle component to reciprocate, the rotation direction of the second bristle component is opposite to that of the first bristle component, and the second bristle component can also reciprocate, so that the cleaning effect can be further improved.

BRIEF DESCRIPTION OF THE DRAWINGS

In order to explain the embodiments of the present disclosure or the technical schemes in the prior art more clearly, the drawings that need to be used in the embodiments will be briefly introduced. Obviously, the drawings in the following description are only some embodiments of the present disclosure. For those skilled in the art, other drawings can be obtained according to these drawings without creative labor.

In the figures, 1. Brush head body; Driving device; 21. First gear component; 211. First shaft rod; 212. First circumferential tooth; 213. First arc-shaped tooth; 22. Second gear component; 221. Second shaft rod; 222. Second circumferential tooth; 223. Second arc-shaped teeth; 23. Third gear component; 24. Screw; 25. Crown gear; 26. Connecting shaft; 30. Transmission shaft; 31. Connecting joint; 3100. Clamping hole; 32. First gear part; 33. Second gear part; 41. First brush rod; 42. First bristle part; 51. Second brush rod; 52. Second bristle part; 521. Cleaning bristle; 522. Massage brush rod; 7. Protection plate; 8. Machine body; 91. Outer side surface; 92. Occlusal surface; 93. Inner side surface.

DETAILED DESCRIPTION OF THE EMBODIMENTS

In order to make the purpose, technical scheme and advantages of the present disclosure clearer, the technical scheme of the present disclosure will be described in detail hereinafter. Obviously, the described embodiments are only part of the embodiments of the present disclosure, rather than all of the embodiments. Based on the embodiment of the present disclosure, all other embodiments obtained by those skilled in the art without any creative effort belong to the scope of protection of the present disclosure.

In the description of the present disclosure, it should be understood that the orientation or position relationship indicated by the terms "center", "length", "width", "height", "upper", "lower", "front", "rear", "left", "right", "vertical", "horizontal", "top", "bottom", "inner", "outer", "side" and the like is based on the orientation or position relationship shown in the attached drawings, which is only for the convenience of describing the present disclosure and simplifying the description, rather than indicate or imply that the referred devices or elements must have a specific orientation, be constructed and operated in a specific orientation. Therefore, it should not be understood as a limitation of the present disclosure. In the description of the present disclosure, unless otherwise stated, "a plurality of" means two or more.

The embodiment of the present disclosure provides a different-axis bidirectional brush head structure and an electric toothbrush, which can clean an inner side surface, an occlusal surface, or an outer side surface and an occlusal surface of the same tooth at the same time, thus improving the cleaning efficiency and the cleaning effect.

The technical scheme provided by the present disclosure will be described in more detail with reference to FIGS. 1 to 9.

Figure 1:
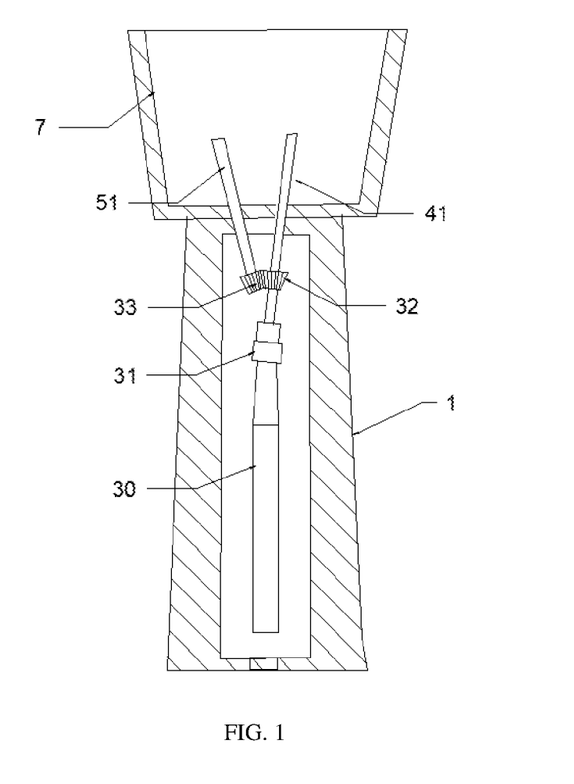
FIG. 1 is a schematic structural diagram of a different-axis bidirectional brush head.
Figure 4:
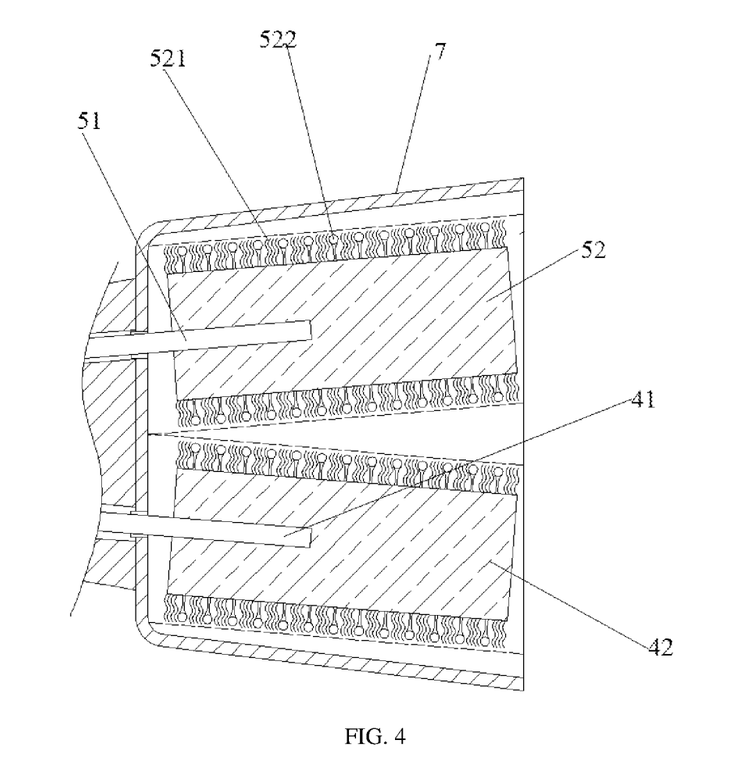
FIG. 4 is a schematic structural diagram of a first bristle component and a second bristle component.

As shown in FIG. 1 and FIG. 4, this embodiment provides a different-axis bidirectional brush head structure, comprising a brush head body 1, a transmission shaft 30, a first bristle component and a second bristle component, wherein: the transmission shaft 30 is located in the brush head body 1 and rotates in the same direction or reciprocates in different directions with its own axis as the axis; the transmission shaft 30 is in transmission connection with the first bristle component for driving the first bristle component to rotate clockwise or counterclockwise; the first bristle component is in transmission connection with the second bristle component, rotation directions of the first bristle component and the second bristle component are opposite, a distance between the first bristle component and the second bristle component gradually increases along the direction away from the transmission shaft 30, and the first bristle component and the second bristle component are in a V-shaped structure.

The term "reciprocating" refers to rotating by a set angle clockwise and then rotating by another set angle counterclockwise.

According to the different-axis bidirectional brush head structure of this embodiment, the first bristle component and the second bristle component are in a V-shaped structure, so that an inner side surface 93, an occlusal surface 92, or an outer side surface 91 and an occlusal surface 92 of the same tooth 9 can be cleaned at the same time, and the cleaning efficiency and the cleaning effect are improved. Because the transmission shaft 30 rotates in the same direction or reciprocates in different directions with its own axis as the axis, the transmission shaft 30 drives the first bristle component to reciprocate, the rotation direction of the second bristle component is opposite to that of the first bristle component, and the second bristle component can also reciprocate, so that the cleaning effect can be further improved.

The brush head structure can automatically clean the tooth gap along the direction of the tooth gap, thereby increasing the effect of cleaning the tooth gap.

Specifically, the driving mechanism 2 in which the transmission shaft 30 rotates in the same direction or reciprocates in different directions with its own axis as the axis will be described in detail hereinafter.

As an alternative embodiment, as shown in FIG. 1, the first bristle component comprises a first brush rod 41, the second bristle component comprises a second brush rod 51, the transmission shaft 30 is connected with the first brush rod 41, the first brush rod 41 and the second brush rod 51 are in meshing transmission through a gear component, and the distance between the first brush rod 41 and the second brush rod 51 gradually increases in the direction away from the gear component.

The gear component comprises a first gear part 32 and a second gear part 33. The first gear part 32 is fixed to the end of the first brush rod 41, and the second gear part 33 is fixed at the end of the second brush rod 51. The first gear part 32 and the second gear part 33 are meshed with each other. When the transmission shaft 30 drives the first brush rod 41 to rotate, the second brush rod 51 can rotate through the matching structure of the first gear part 32 and the second gear part 33, and the rotation direction of the second brush rod 51 is opposite to that of the first brush rod 41.

Figure 2:
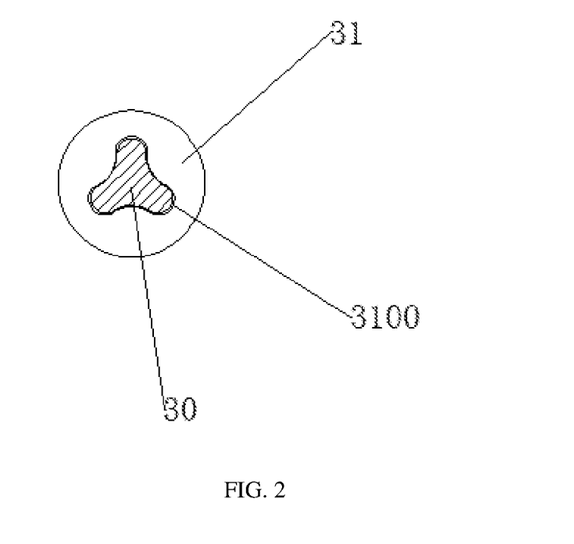
FIG. 2 is a schematic structural diagram of a fixed connection between a transmission shaft and a connecting joint.

As shown in FIGS. 1 and 2, the transmission shaft 30 is fixedly connected with the first brush rod 41 through the connecting joint 31. The connecting joint 31 is provided with a clamping hole 3100. One end of the transmission shaft 30 is provided with an insertion part adapted to the shape of the clamping hole 3100. The insertion part extends into the clamping hole 3100, thus clamping and fixing the transmission shaft 30 and the connecting joint 31. The connecting joint 31 is fixedly connected with the first brush rod 41, thereby connecting the transmission shaft 30 and the first brush rod 41, which is convenient for driving the first brush rod 41 to rotate through the connecting joint 31 after the transmission shaft 30 rotates.

The clamping hole 3100 has a polygonal or irregular structure, which can limit the relative displacement of the transmission shaft 30 in the circumferential direction.

As an alternative embodiment, as shown in FIG. 4, the first bristle component further comprises a first bristle part 42, one end of the first brush rod 41 away from the transmission shaft 30 extends out of the brush head body 1, and the first bristle part 42 is fixed to the end of the first brush rod 41: the second bristle component further comprises a second bristle part 52, one end of the second brush rod 51 away from the transmission shaft 30 extends out of the brush head body 1, and the second bristle part 52 is fixed to the end of the second brush rod 51.

Figure 9:
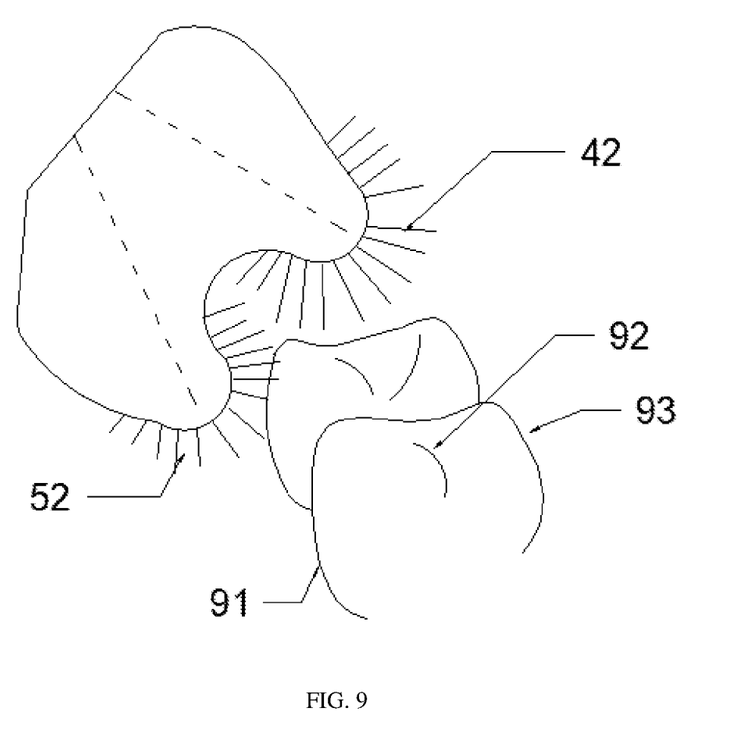
FIG. 9 is a schematic diagram of a different-axis bidirectional brush head structure when cleaning teeth.

The distance between the first bristle part 42 and the second bristle part 52 also gradually increases in the direction away from the transmission shaft 30. As shown in FIG. 9, when the brush head body 1 cleans the teeth 9, the first bristle part 42 and the second bristle part 52 can clean at least the outer side surface 91, the occlusal surface 92 of the teeth 9 or the occlusal surface 92 and the inner side surface 93 of the teeth at the same time.

Moreover, because the distance between the first bristle part 42 and the second bristle part 52 gradually increases in the direction away from the transmission shaft 30, in this way, when the first bristle part 42 and the second bristle part 52 are placed on teeth, the position of teeth to be cleaned is located between the first bristle part 42 and the second bristle part 52. Different parts of the first bristle part 42 and the second bristle part 52 exert different pressures on teeth. When the pressure is high, the cleaning effect is excellent, while when the pressure is low; the user is more comfortable. With the above structure, the toothbrush can give consideration to both comfort and cleaning effect when in use.

As an alternative embodiment, as shown in FIG. 4, the first bristle part 42 and the second bristle part 52 both comprise a body, a cleaning bristle 521 and a massage brush rod 522, the cleaning bristle 521 is arranged around a circumference of the body, the massage brush rod 522 is fixed to the body and is arranged at intervals along the length direction of the body, and one end of the massage brush rod 522 away from the body is provided with a massage ball.

The massage brush rod 522 is located between the cleaning bristles 521, which can massage the teeth with a massage ball and prevent the bristles from knotting.

Figure 3:
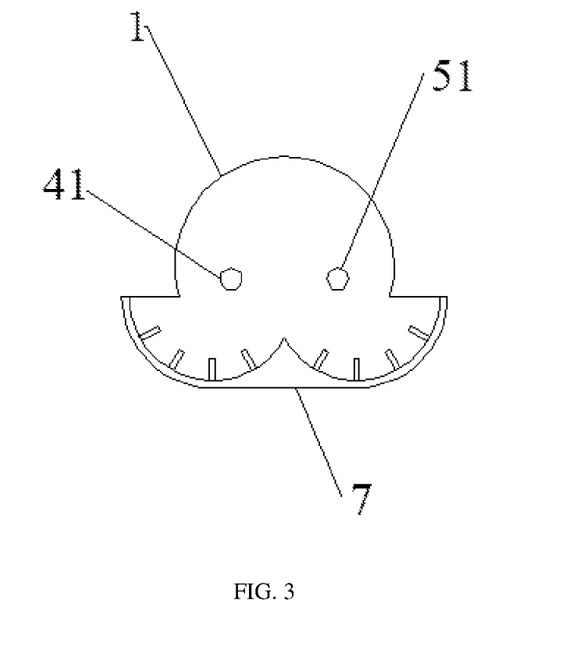
FIG. 3 is a schematic structural diagram of a protection plate.

As an alternative embodiment, as shown in FIGS. 1, 3 and 4, the brush head structure further comprises a protection plate 7, and the protection plate 7 is fixedly connected to the end of the brush head body 1 and covers the first bristle part 42 or the second bristle part 52. On the one hand, the protection plate 7 can block toothpaste foam and prevent toothpaste foam from splashing when the first bristle part 42 and the second bristle part 52 roll in the oral cavity to generate toothpaste foam, and on the other hand, the protection plate can prevent the first bristle part 42 and the second bristle part 52 from causing excessive friction to the oral cavity and the gum of a user and from causing injuries.

Embodiment 2

This embodiment provides an electric toothbrush, comprising a machine body 8, a driving mechanism 2 and a different-axis bidirectional brush head structure described above, wherein the machine body 8 is fixedly connected with a brush head body 1: the driving mechanism 2 is in driving connection with a transmission shaft 30, and drives the transmission shaft 30 to reciprocate in different directions with its own axis as the axis. "Different directions" refer to the clockwise direction and the counterclockwise direction.

According to the electric toothbrush of this embodiment, the driving mechanism 2 can drive the transmission shaft 30 to reciprocate in different directions with its own axis as the axis. The transmission shaft 30 drives the first bristle component to reciprocate. The rotation directions of the second bristle component and the first bristle component are opposite. Moreover, the second bristle component can also reciprocate, so that the first bristle part 42 and the second bristle part 52 can swing, and the cleaning effect can be further improved.

Figure 5:
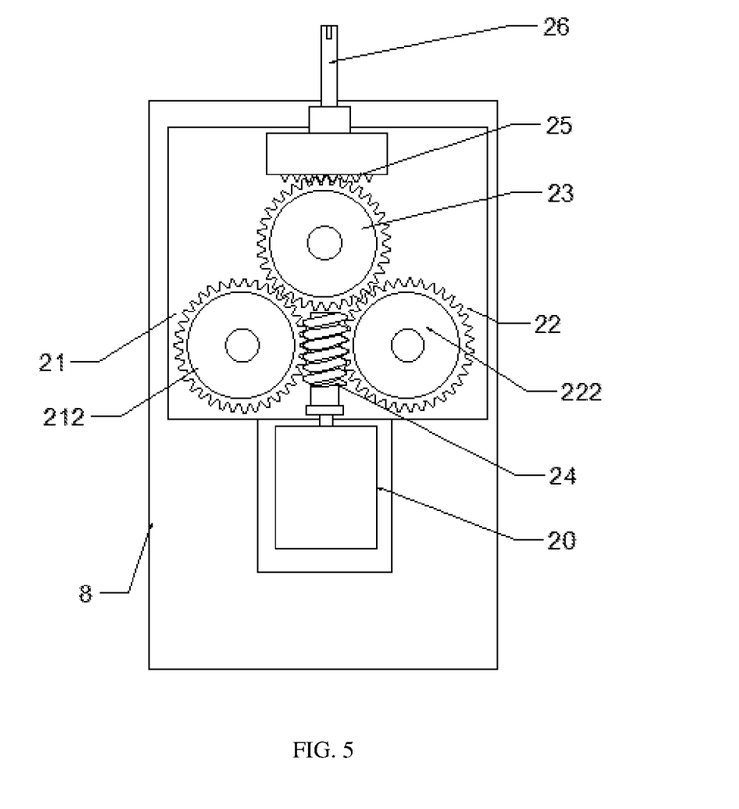
FIG. 5 is a schematic structural diagram of a driving mechanism.

As an alternative embodiment, as shown in FIG. 5, the driving mechanism 2 comprises a driving device 20, a screw 24, and a first gear component 21, a second gear component 22, a third gear component 23 and a connecting shaft 26 which are rotatably connected in the machine body 8, wherein: the driving device 20 can be a motor, the driving device 20 is fixed in the machine body 8 and is in driving connection with the screw 24 for driving the screw 24 to rotate, and the screw 24 is always in meshing transmission with the first gear component 21 and the second gear component 22: the first gear component 21 or the second gear component 22 is in meshing transmission with the third gear component 23, thereby driving the third gear component 23 to rotate clockwise or counterclockwise, the third gear component 23 is in transmission connection with the connecting shaft 26, and the connecting shaft 26 is fixedly connected with the transmission shaft 30.

Specifically, with reference to FIGS. 1 and 5, one end of the connecting shaft 26 extends out of the machine body 8 and can extend into the brush head body 1 to be inserted and fixed to the transmission shaft 30.

Specifically, when the first gear component 21 is in meshing transmission with the third gear component 23, the second gear component is separated from the third gear component 23. When the first gear component 21 is separated from the third gear component 23, the second gear component is in meshing transmission with the third gear component 23. In this way, the third gear component 23 can drive the connecting shaft 26 to rotate clockwise or counterclockwise. When the connecting shaft 26 is fixedly connected with the transmission shaft 30, the transmission shaft 30 reciprocates with its own axis as the axis.

As an alternative embodiment, as shown in FIGS. 5 to 8, the first gear component 21 comprises a first shaft rod 211 rotatably connected in the machine body 8, first circumferential teeth 212 and first arc-shaped teeth 213 fixed to the first shaft rod 211, the first circumferential teeth 212 and the first arc-shaped teeth 213 are arranged along the length direction of the first shaft rod 211, the first circumferential teeth 212 are arranged around a circumference of the first shaft rod 211 and are in meshing transmission with the screw 24, and a central angle of the first arc-shaped teeth 213 is less than 360 degrees: the second gear component 22 comprises a second shaft rod 221 rotatably connected in the machine body 8, second circumferential teeth 222 and second arc-shaped teeth 223 fixed to the second shaft rod 221, the second circumferential teeth 222 and the second arc-shaped teeth 223 are arranged along the length direction of the second shaft rod 221, the second circumferential teeth 222 are arranged around a circumference of the second shaft rod 221 and are in meshing transmission with the screw 24, and a central angle of the second arc-shaped teeth 223 is less than 360 degrees: when the first arc-shaped teeth 213 are in meshing transmission with the third gear component 23, the second arc-shaped teeth 223 are disengaged from the third gear component 23, and when the first arc-shaped teeth 213 are disengaged from the third gear component 23, the second arc-shaped teeth 223 are in meshing transmission with the third gear component 23.

Figure 6:
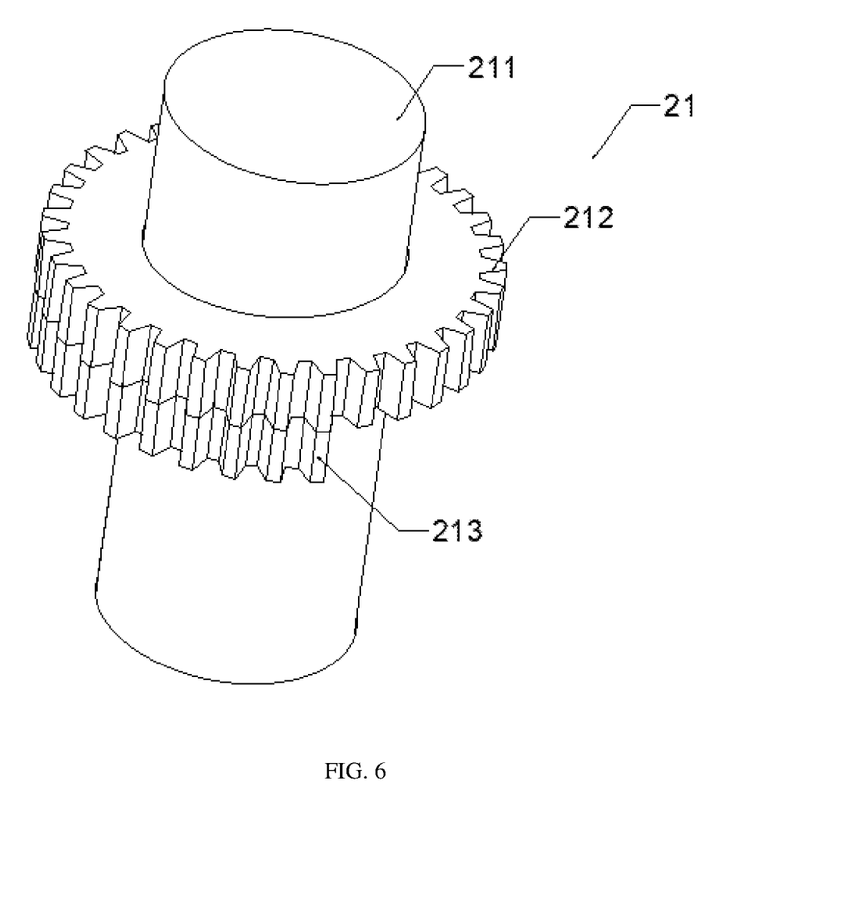
FIG. 6 is a schematic structural diagram of a first gear component.

Referring to FIG. 6, FIG. 6 is a schematic structural diagram of a first gear component 21: the second gear component 22 is similar in structure, except that the central angle of the second arc-shaped tooth 223 is different from that of the first arc-shaped tooth 213.

With reference to FIGS. 5 to 6, the screw 24 is always in meshing transmission with the first circumferential tooth 212 and the second circumferential tooth 222. As shown in FIG. 5, when the driving device 20 operates, the first gear component 21 and the second gear component 22 always rotate in opposite directions, but the third gear component 23 does not always rotate in the same direction.

Figure 7:
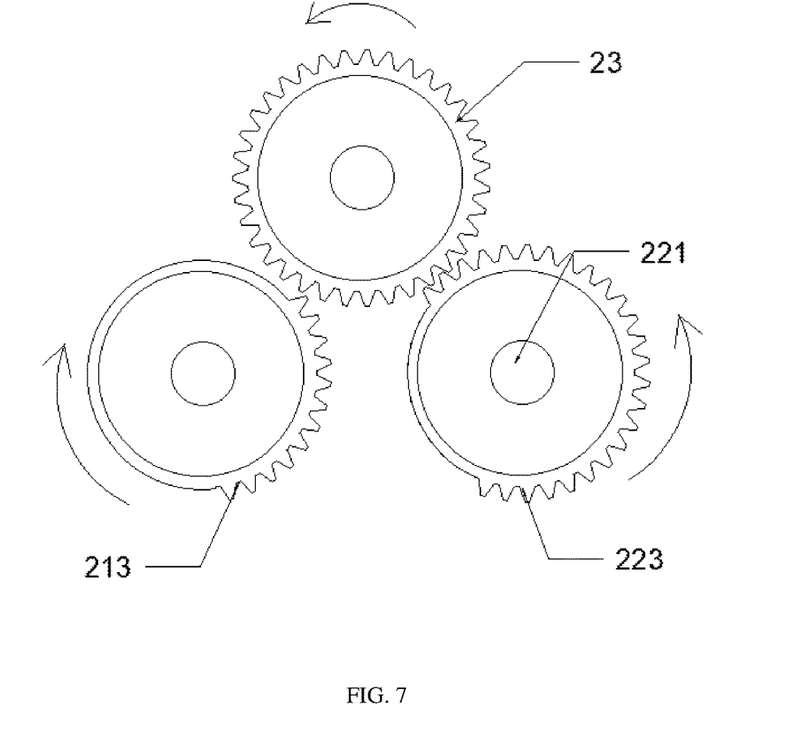
FIG. 7 is a schematic structural diagram of a first circumferential tooth just separated from a third gear component and a second circumferential tooth just meshed with the third gear component.
Figure 8:
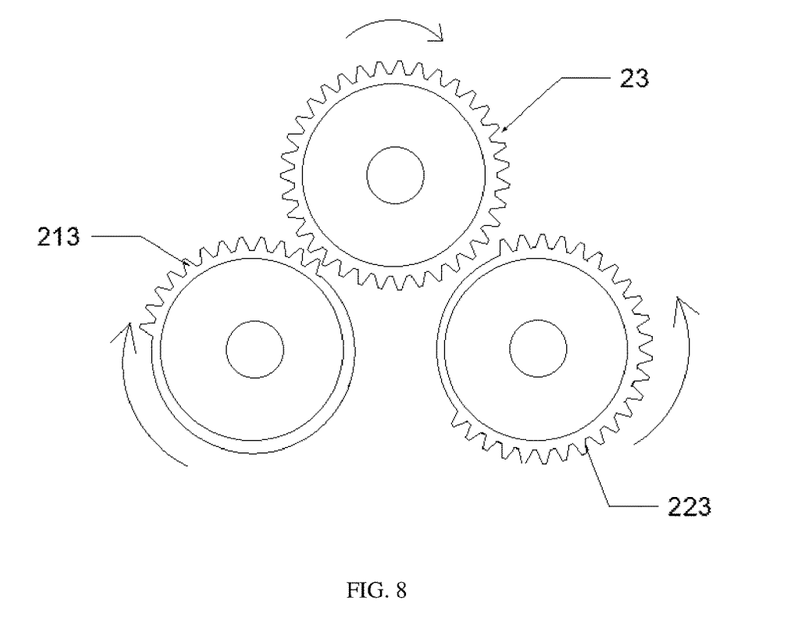
FIG. 8 is a schematic structural diagram of a first circumferential tooth just meshed with a third gear component and a second circumferential tooth just separated from a third gear component.

Referring to FIG. 6, the first arc-shaped tooth 213 and the second arc-shaped tooth 223 are not in a circumferential tooth structure. Referring to FIG. 7, when the first arc-shaped tooth 213 just disengaged from the third gear component 23, the second arc-shaped tooth 223 just starts to be meshed with the third gear component 23, and the third gear component 23 rotates in the forward direction at this time. Referring to FIG. 8, when the first arc-shaped tooth 213 is in just meshing transmission with the third gear component 23, the second arc-shaped tooth 223 just starts to be disengaged from the third gear component 23, and the third gear component 23 rotates in the reverse direction at this time. That is, the third gear component 23 is in meshing transmission with the first arc-shaped tooth 213 or the second arc-shaped tooth 223.

One of the "forward direction" and the "reverse direction" is clockwise, and the other thereof is counterclockwise.

As an alternative embodiment, as shown in FIG. 5, a crown gear 25 is fixed at an end of the connecting shaft 26, and the crown gear 25 is located in the machine body 8 and is in meshing transmission with the third gear component 23.

The third gear component 23 drives the connecting shaft 26 to rotate through the crown gear 25. When the rotation direction of the third gear component 23 is different, the rotation direction of the crown gear 25 is different, so that the connecting shaft 26 can reciprocate in different directions with its own axis as the axis. The connecting shaft 26 is fixedly connected with the transmission shaft 30, and the transmission shaft 30 can reciprocate in different directions with its own axis as the axis.

If every time the transmission shaft 30 swings, the rotation angle of the transmission shaft 30 in the clockwise direction is the same as that in the counterclockwise direction, the same position will always be used to clean teeth on the first bristle part 42 and the second bristle part 52. The cleaning bristles 521 of the first bristle part 42 and the second bristle part 52 will be seriously worn locally, and their service life will be shortened.

In view of the above problems, the central angle of the first arc-shaped teeth 213 is smaller than that of the second arc-shaped teeth 223, so that an angle at which the connecting shaft 26 rotates in a counterclockwise direction is different from an angle at which the connecting shaft rotates in a clockwise direction.

Specifically, the number of teeth of the first arc-shaped teeth 213 is less than that of the second arc-shaped teeth 223. In this way, the rotation angles of the connecting shaft 26 and the transmission shaft 30 are different when the connecting shaft and the transmission shaft rotate clockwise and counterclockwise every time the connecting shaft and the transmission shaft swing, so that the bristles at different positions of the first bristle part 42 and the second bristle part 52 can be used for cleaning teeth.

Specifically, the sum of the number of teeth of the first arc-shaped teeth 213 and the second arc-shaped teeth 223 is one less than that of the first circumferential teeth 212 (the second circumferential teeth 222 have the same number of teeth as the first circumferential teeth 212), so that the influence of motion interference can be reduced.

Embodiment 3

The difference between this embodiment and Embodiment 2 is that the driving mechanism 2 comprises a driving device, and the output end of the driving device is in driving connection with the transmission shaft 30. The driving device can be a motor, which rotates with the transmission shaft 30 through a coupling, etc., and drives the transmission shaft 30 to rotate in the same direction (in the clockwise direction or in the counterclockwise direction) with its own axis as the axis.

In the description of this specification, the specific features, structures or features may be combined in any one or more embodiments or examples in a suitable manner.

In the description of this specification, the description referring to the terms "one embodiment", "some embodiments", "examples", "specific examples" or "one example" means that the specific features, structures, materials or characteristics described in connection with this embodiment or example are included in at least one embodiment or example of the present disclosure. In this specification, the schematic expressions of the above terms do not necessarily refer to the same embodiment or example. Furthermore, the specific features, structures, materials or characteristics described may be combined in any one or more embodiments or examples in a suitable manner. In addition, those skilled in the art can incorporate and combine different embodiments or examples and features of different embodiments or examples described in this specification without contradicting each other.

The above are only the specific embodiments of the present disclosure, but the scope of protection of the present disclosure is not limited thereto. Any changes or substitutions conceivable to those skilled in the art within the technical scope disclosed by the present disclosure should be covered by the scope of protection of the present disclosure. Therefore, the scope of protection of the present disclosure should be based on the scope of protection of the claims.

What is claimed is:

1. A different-axis bidirectional brush head structure, comprising a brush head body, a transmission shaft, a first bristle component and a second bristle component, wherein:
    the transmission shaft is located in the brush head body and rotates in the same direction or reciprocates in different directions with its own axis as the axis;
    the transmission shaft is in transmission connection with the first bristle component for driving the first bristle component to rotate clockwise or counterclockwise;
    the first bristle component is in transmission connection with the second bristle component, rotation directions of the first bristle component and the second bristle component are opposite, a distance between the first bristle component and the second bristle component gradually increases along the direction away from the transmission shaft, and the first bristle component and the second bristle component are in a V-shaped structure;
    a machine body;
    a driving mechanism;
    wherein the machine body is fixedly connected with a brush head body; the driving mechanism is in driving connection with the transmission shaft, and drives the transmission shaft to rotate in the same direction or reciprocate in different directions with its own axis as the axis;
    wherein the driving mechanism comprises a driving device, a screw, and a first gear component, a second gear component, a third gear component and a connecting shaft which are rotatably connected in the machine body, wherein:
    the driving device is fixed in the machine body and is in driving connection with the screw for driving the screw to rotate, and the screw is always in meshing transmission with the first gear component and the second gear component;
    the first gear component or the second gear component is in meshing transmission with the third gear component, thereby driving the third gear component to rotate clockwise or counterclockwise, the third gear component is in transmission connection with the connecting shaft, and the connecting shaft is fixedly connected with the transmission shaft;
    wherein the first gear component comprises a first shaft rod rotatably connected in the machine body, first circumferential teeth and first arc-shaped teeth fixed to the first shaft rod, the first circumferential teeth are arranged around a circumference of the first shaft rod and are in meshing transmission with the screw, and a central angle of the first arc-shaped teeth is less than 360 degrees;
    the second gear component comprises a second shaft rod rotatably connected in the machine body, second circumferential teeth and second arc-shaped teeth fixed to the second shaft rod, the second circumferential teeth are arranged around a circumference of the second shaft rod and are in meshing transmission with the screw, and a central angle of the second arc-shaped teeth is less than 360 degrees; and
    when the first arc-shaped teeth are in meshing transmission with the third gear component, the second arc-shaped teeth are disengaged from the third gear component, and when the first arc-shaped teeth are disengaged from the third gear component, the second arc-shaped teeth are in meshing transmission with the third gear component.

2. The different-axis bidirectional brush head structure according to claim 1, wherein the first bristle component comprises a first brush rod, the second bristle component comprises a second brush rod, the transmission shaft is connected with the first brush rod, the first brush rod and the second brush rod are in meshing transmission through a gear component, and the distance between the first brush rod and the second brush rod gradually increases in the direction away from the gear component.

3. The different-axis bidirectional brush head structure according to claim 2, wherein the first bristle component further comprises a first bristle part, one end of the first brush rod away from the transmission shaft extends out of the brush head body, and the first bristle part is fixed to the end of the first brush rod;
    the second bristle component further comprises a second bristle part, one end of the second brush rod away from the transmission shaft extends out of the brush head body, and the second bristle part is fixed to the end of the second brush rod.

4. The different-axis bidirectional brush head structure according to claim 3, wherein the first bristle part and the second bristle part both comprise a body, a cleaning bristle and a massage brush rod, the cleaning bristle is arranged around a circumference of the body, the massage brush rod is fixed to the body and is arranged at intervals along the length direction of the body, and one end of the massage brush rod away from the body is provided with a massage ball.

5. The different-axis bidirectional brush head structure according to claim 3, wherein the brush head structure further comprises a protection plate, and the protection plate is fixedly connected to the end of the brush head body and covers the first bristle part or the second bristle part.

6. The electric toothbrush according to claim 1, wherein the central angle of the first arc-shaped teeth is smaller than that of the second arc-shaped teeth, so that an angle at which the connecting shaft rotates in a counterclockwise direction is different from an angle at which the connecting shaft rotates in a clockwise direction.

7. The electric toothbrush according to claim 1, wherein a crown gear is fixed at an end of the connecting shaft, and the crown gear is located in the machine body and is in meshing transmission with the third gear component.

\* \* \* \* \*